US007065187B2

(12) United States Patent
Myers et al.

(10) Patent No.: US 7,065,187 B2
(45) Date of Patent: Jun. 20, 2006

(54) SYSTEM AND METHOD FOR ANNOTATING VOICE MESSAGES

(75) Inventors: Andrew Myers, Wayland, MA (US); Srinivasa Rao Kolaparthi, North Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 10/041,571

(22) Filed: Jan. 10, 2002

(65) Prior Publication Data

US 2003/0128817 A1    Jul. 10, 2003

(51) Int. Cl.
  *H04M 1/64*    (2006.01)
(52) U.S. Cl. .................................. 379/88.22; 379/88.11
(58) Field of Classification Search .................. 379/67, 379/1, 88.01, 88.22, 88.26, 88.27, 88.11, 379/100.05, 93.17, 211.01; 704/270, 240
See application file for complete search history.

(56) References Cited

U.S. PATENT DOCUMENTS

| 5,526,407 A | * | 6/1996 | Russell et al. ............ 379/88.25 |
| 6,404,856 B1 | * | 6/2002 | Wilcox et al. ............ 379/88.22 |
| 6,956,593 B1 | * | 10/2005 | Gupta et al. ................. 715/751 |
| 2002/0130904 A1 | * | 9/2002 | Becker et al. ............... 345/753 |

* cited by examiner

*Primary Examiner*—Ovidio Escalante
(74) *Attorney, Agent, or Firm*—Pillsbury Winthrop Shaw Pittman, LLP

(57) ABSTRACT

A system and method for enabling annotation of audible voice messages in a unified communication services (UCS) system. In some embodiments, subscribers access a message presentation form that enables simultaneous playback and annotation of audible voice messages.

23 Claims, 3 Drawing Sheets

SYSTEM AND METHOD FOR ANNOTATING VOICE MESSAGES

FIELD OF THE INVENTION

The present invention relates to a system and method for annotating, with text, voice messages that are received within a unified communications service (UCS).

BACKGROUND OF THE INVENTION

UCS systems are known. Typically, such systems provide subscribers the ability to access multiple message formats at a single interface. For example, a subscriber may access electronic mail (email), facsimile messages, and telephonic messages (voice messages) at the subscriber's desktop computer or other similar device.

Typically, access to the messages is via the subscriber's communications platform. For example, the subscriber may access messages using Lotus Notes, Microsoft Outlook or other suitable messaging platform.

One drawback of some existing systems is that voice messages are often provided as an attached audible file to an email message. To access the attached audible file, the subscriber must open a separate, additional application that provides an audible file player. For example, a subscriber that receives a voice message in Microsoft Outlook must open Windows Media Player to access the attached audible file. Among other things, this may be inefficient and time consuming.

Another drawback of some existing systems is that they do not provide for simultaneous annotation of the voice message. In other words, most communications platforms do not provide a field in which a subscriber may input text while the audible message is playing back. Thus, a subscriber must alternate between listening to the voice message and entering notes. A related drawback with these systems is that any notes that are taken may be stored in a separate location or file from that of the voice message making retrieval of the both files more complicated.

Another drawback of some existing systems is that they do not provide for full text searching of the annotations associated with the voice messages. Thus, retrieval of a particular message can be time consuming and tedious.

Other drawback of existing systems also exist.

SUMMARY OF THE INVENTION

In order to overcome these and other drawbacks of existing systems there is provided a system and method for enabling a subscriber to enter private notes regarding a received voice message. The private notes may be entered simultaneously with playback of the message and on the same message presentation form as the audible voice message player. The private notes are available whenever the voice message is re-accessed by the subscriber, and are retrievable via text search operations.

As mentioned above, the audible voice message player may comprise an integral portion of the message presentation form. One advantage of the present invention is that the audible voice message player remains accessible during entering of private notes, so that the player can be paused, moved forward or back, or otherwise manipulated without losing or interfering with the private notes entry area.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

As discussed herein, the present invention provides a system and method for annotating voice messages that are received by subscribers of a unified communications service (JCS). The UCS may comprise any suitable network of email, telephonic, facsimile, instant messaging, or other messaging services.

Preferably, the UCS contains an interface for presenting messages to subscribers. The interface may vary according to the hardware and software used to generate and access the messages. For example, processor-based hardware (e.g., personal computer, laptop, palm-top, etc.) may implement software based graphical user interfaces (GUIs), or the like, to present messages to subscribers.

Figure 1:
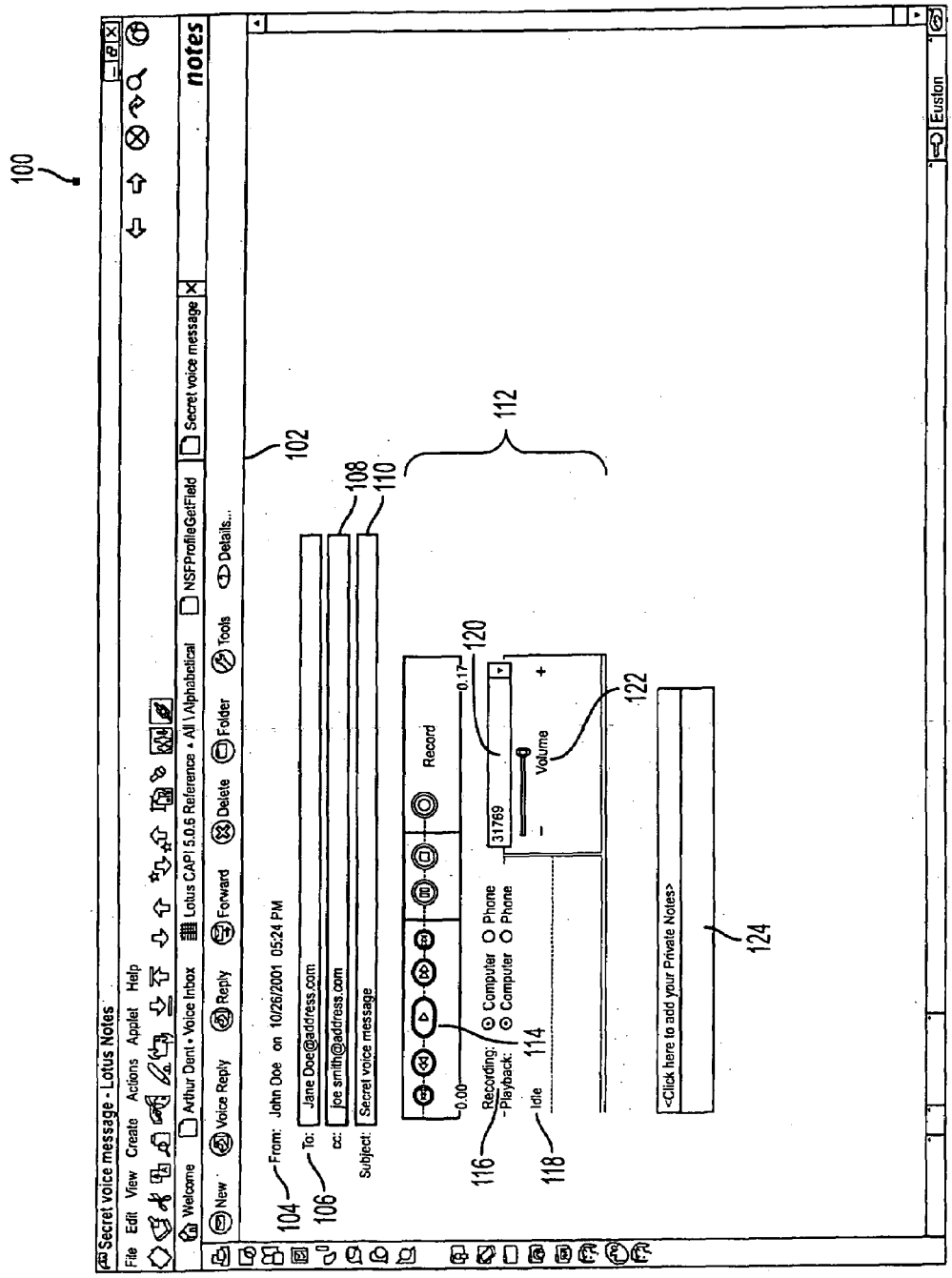
FIG. 1 is message presentation form according to some embodiments of the invention.

The messaging interface may comprise a message presentation form that enables subscribers to access the messages. FIG. 1 is an example of a message presentation form according to one embodiment of the invention. The representation in FIG. 1 shows a message presentation form 100 as it appears in a Lotus Notes™ environment, however, the invention is not so limited. The message presentation form may comprise other features if represented in other environments (e.g., Microsoft Outlook™, AOL™ mail, or the like).

As shown in FIG. 1, message presentation form 100 may comprise a mechanism to enable subscribers to manipulate messages. For example, a tool bar 102, menu, or other mechanism may enable subscribers to create, forward, reply, delete, store, and otherwise manipulate messages. Other functions may also be provided in tool bar 102.

Message presentation form 100 may also comprise a number of fields to enable addressing and delivery of messages, and display of messages. For example, a From field 104 may indicate the sender of the message, a To field 106 may indicate the intended recipient of the message, a cc field 108 may indicate recipients to be copied on the message (a bcc field (not shown) may also be included to indicate blind copy recipients of the message). Other fields may also be included.

Addresses, aliases, or other identifiers may be entered in the above described fields in order to enable routing and delivery of the messages in a known manner.

Message presentation form 100 may also comprise a subject field 110. Subject field 110 may comprise a field that enables a subscriber to enter a descriptive heading for the associated message. In some embodiments, text entered in subject field 110 may be saved with the associated voice message.

In addition, text entered in subject field 110 may be forwarded with the message presentation form when the message is forwarded (or replied to). In some embodiments, the subscriber may indicate whether the text in subject field 110 gets forwarded with the message or remains hidden to subsequent message receivers.

Message presentation form 100 may also comprise an audible message player 112. Audible message player 112 may comprise any suitable interface for play back of audible message files (e.g., .wav files, mp3 files, .au files, .ram files, etc.).

One feature of message presentation form 100 is that audible message player 112 may be an integral part of the form. Such an arrangement enables subscribers to play back an audible message without the need to open a separate audible file player.

Audible message player 112 may comprise any suitable arrangement for play back and recording of audile files. For example, audible message player 112 may comprise play back and record function controls 114 to enable a subscriber to control the play back and recording of audible message files. Function controls 114 may comprise any suitable controls for controlling playback and recording of audible files. For example, function controls 114 may comprise controls for playing, stopping, fast forwarding, reversing, pausing, recording and other playback/record functions of audible files.

Audible message player 112 may also include controls to select the hardware over which an audible file is recorded or played back. For example, audible message player 112 may comprise selection tools 116 to enable to used to select whether playback or recording is to be accomplished with a computer or with a telephone. Other selection tools (e.g., buttons, pull-down menus, etc.) and other hardware choices may be provided as well.

Audible message player 112 may also comprise an indicator 118 to indicate the playback or record status of audible files. While FIG. 1 shows a text indicator 118, any suitable indicator 118 may be used (e.g., graphical, numerical, etc.).

Audible message player 112 may also comprise a telephone extension input field 120. Telephone extension input field 120 may enable a subscriber to select a telephone extension to which delivery of an audible message is desired.

Audible message player 112 may also comprise various sound quality controls. For example, audible message player 112 may comprise volume control 122 or other tone and sound quality controls (not shown).

Message presentation form 100 may also comprise a private notes field 124. Private notes field 124 may comprise any suitable field for enabling subscriber input of annotations during playback or recording of audible messages. For example, private notes field 124 may comprise an area which, when selected via a mouse or other selection mechanism, enables the subscriber to input or alter text annotations while audible message player 112 is playing or recording an audible message.

In addition, annotations entered in private notes field 124 may be stored with the associated audible message. In this manner, a subscriber may read the annotations associated with the audible message without having to access a separate application. Likewise, the subscriber need not play back the audible message to get the desired information as the annotations entered in private notes field 124 may be read without playing the message. Other advantages also exist.

In some embodiments, annotations in the private notes field 124 may only be forwarded to subsequent message recipients at the option of the sender. For example, a sender may select an option to hide the annotations in private notes field 125 upon forwarding or replying to the message.

In some embodiments, the default is that the annotation in private notes field 124 will not be viewable by subsequent recipients. Other embodiments do not allow any annotations in private notes field 124 to be viewable by subsequent recipients. Other configurations are also possible.

Figure 2:
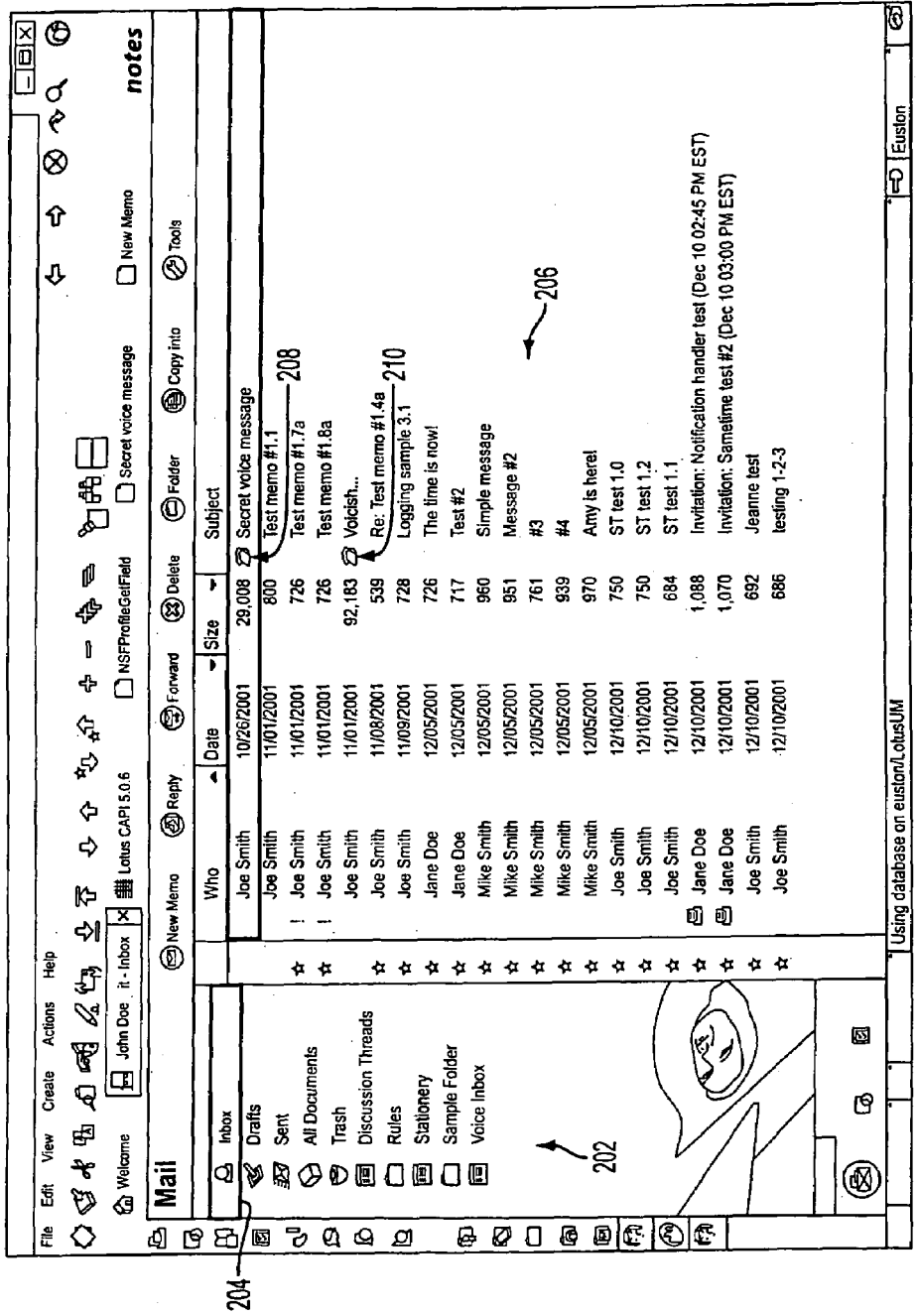
FIG. 2 is a messaging interface according to some embodiments of the invention.

FIG. 2 is an example of a messaging interface 200 for a UCS according to some embodiments of the invention. Again, the environment shown is Lotus Notes,™ but the invention is not so limited. Any suitable environment may be used.

As shown in FIG. 2, the messaging interface 200 may comprise a number of storage locations (or folders) 202 that enable organization of messages. For example, an inbox folder 204 may be used to display received messages as indicated generally at 206.

Messaging interface 200 may also provide for the display of various icons 208, 210 that indicate the type of message (e.g., voice message, email, facsimile, etc.). Other information, such as sender, delivery date and time, message size, etc., may also be listed in messaging interface 200 as is known.

Figure 3:
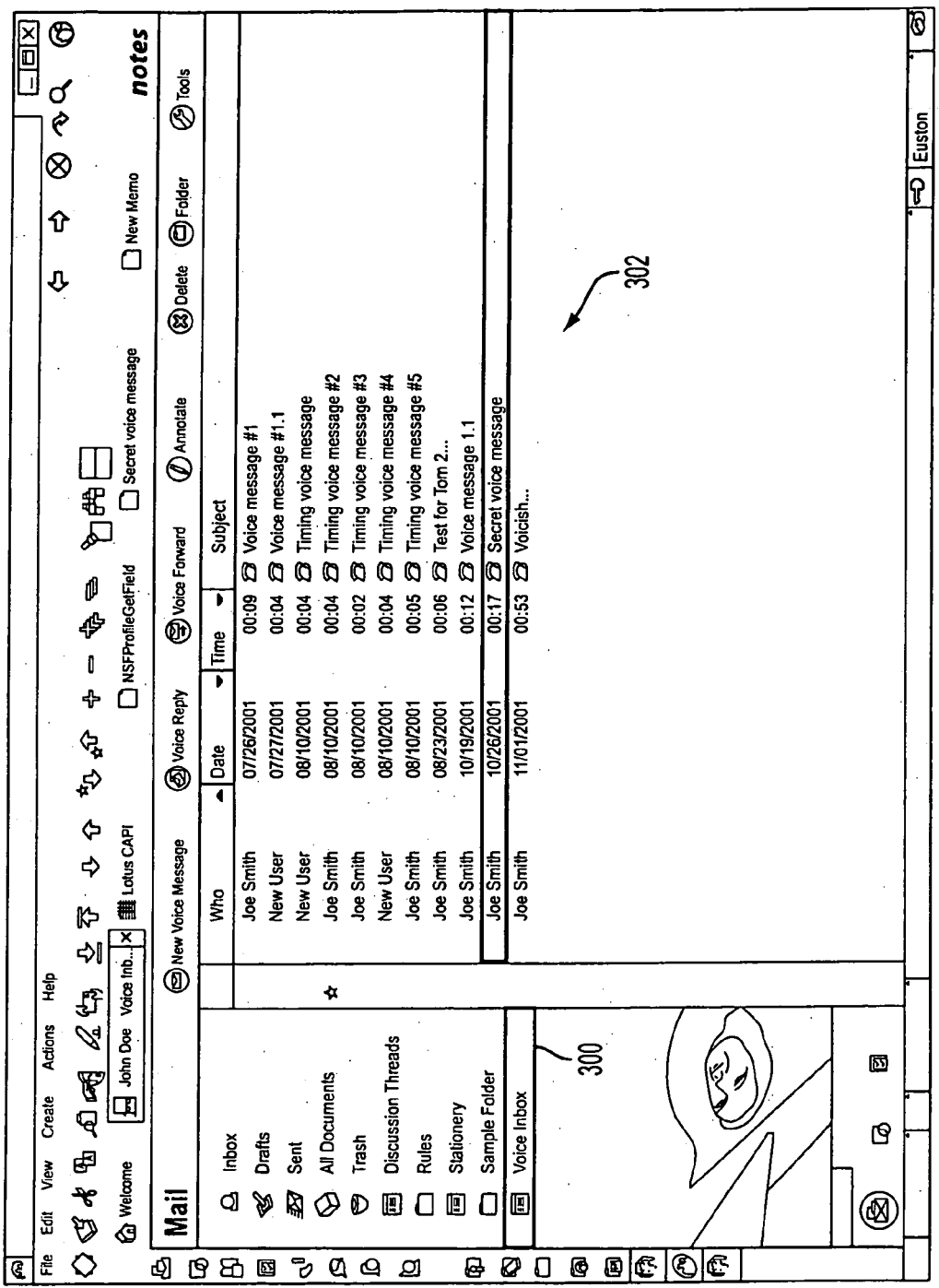
FIG. 3 is a voice message inbox folder according to some embodiments of the invention.

FIG. 3 is an example of a voice inbox storage folder 300 according to some embodiments of the invention. Voice storage folder 300 may enable display of a subscriber's received voice messages as indicated generally at 302. Other configurations are possible.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A system for annotating audible messages that are received by a subscriber of a unified communications service network, the system comprising:

a message presentation form that enables the subscriber to access audible messages, the message presentation form further comprising:

an audible message player that enables playback of audible messages;

a notes field that enables the subscriber to annotate the audible messages during playback of the audible messages; and a message forwarder that enables forwarding of audible messages, wherein the annotations associated with the audible messages are forwarded at the option of the subscriber.

2. The system of claim 1 further comprising:
a search tool that enables search and retrieval of audible messages based, at least in part, upon annotations in the notes field.

3. The system of claim 1 wherein the message forwarder is adapted to forward annotations in the notes field.

4. The system of claim 1 wherein the message forwarder is adapted to not forward annotations in the notes field.

5. The system of claim 1 wherein the message presentation form further comprises:
a subject field that enables input of a subject heading for the audible messages.

6. The system of claim 5 wherein the message forwarder enables forwarding of audible messages with the subject heading.

7. A method for annotating audible messages that are received by a subscriber of a unified communications service network, the method comprising:
presenting the subscriber with a graphical user interface having a message presentation form that enables the subscriber to access audible messages;
providing an audible message player associated with the graphical user interface that enables playback of audible messages;
providing a notes field associated with the graphical user interface that enables the subscriber to annotate the audible messages during playback of the audible messages; and
providing a message forwarder associated with the graphical user interface that enables forwarding of audible messages to other recipients wherein the annotations in the notes field associated with the audible messages are forwarded at the option of the subscriber.

8. The method of claim 7 further comprising:
providing a search tool that enables search and retrieval of audible messages based, at least in part, upon annotations in the notes field.

9. The method of claim 7 wherein
annotations in the notes field are forwarded.

10. The method of claim 7 wherein annotations in the notes field are not forwarded.

11. The method of claim 7 wherein the graphical user interface further enables the user to input a subject heading in a subject field for the audible messages and provides an option of forwarding the subject heading.

12. A system for annotating audible messages that are received by a subscriber of a unified communications service network, the system comprising:
message presentation form providing means for enabling the subscriber to access audible messages, the message presentation form means further comprising:
audible message player means for enabling playback of audible messages;
notes field means for enabling the subscriber to annotate the audible messages during playback of the audible messages; and
message forwarder means for enabling forwarding of audible messages to other recipients wherein annotations in the private notes field means associated with the audible messages are forwarded at the option of the subscriber.

13. The system of claim 12 further comprising:
search tool means for enabling search and retrieval of audible messages based, at least in part, upon annotations in the notes field means.

14. The system of claim 12 wherein the message forwarder means forwards the annotations in the notes field means.

15. The system of claim 12 wherein the message forwarder means does not forward the annotations in the private field means.

16. The system of claim 12 wherein the message presentation form providing means further comprises:
subject field means for enabling input of a subject heading for the audible messages.

17. The system of claim 16 wherein the message forwarder means enables forwarding of audible messages with the subject heading.

18. A processor readable medium having process readable code embodied therein for causing a processor to annotate audible messages that are received by a subscriber of a unified communications service network, the processor readable medium comprising:
processor readable code that enables a processor to present a message presentation form that enables the subscriber to access audible messages, the message presentation form further comprising:
an audible message player that enables playback of audible messages; and
a notes field that enables the subscriber to annotate the audible messages during playback of the audible messages;
processor readable code that enables a processor to provide a message forwarder that enables forwarding of audible messages to other recipients wherein annotations in the notes field associated with the audible messages are forwarded at the option of the subscriber.

19. The processor readable medium of claim 18 further comprising:
processor readable code that enables a processor to provide a search tool that enables search and retrieval of audible messages based, at least in part, upon annotations in the notes field.

20. The processor readable medium of claim 18 wherein annotations in the notes field are forwarded.

21. The processor readable medium of claim 18 wherein annotations in the notes field are not forwarded.

22. The processor readable medium of claim 18 wherein the processor readable code for presenting the message presentation form further includes presenting a subject field that enables input of a subject heading for the audible messages.

23. The processor readable medium of claim 22 wherein the processor readable code that enables a processor to provide the message forwarder enables forwarding of audible messages with the subject heading.

* * * * *